Jan. 13, 1925. 1,523,276
J. A. NORDIN
CATCHING MEMBER FOR THE MOVEMENT OF MEAT SLICING MACHINES
Filed May 5, 1923
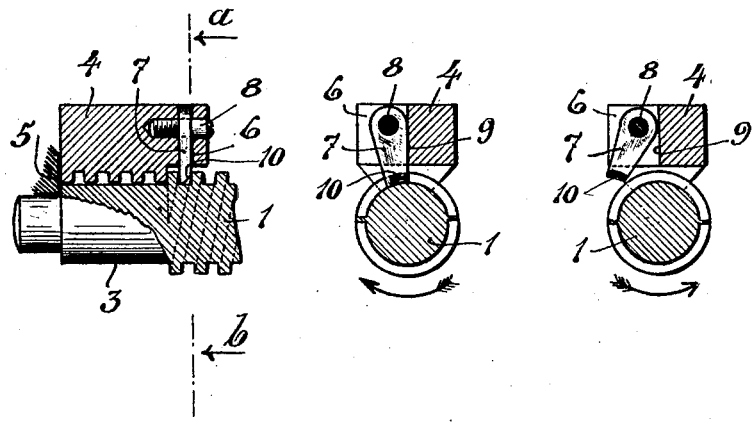
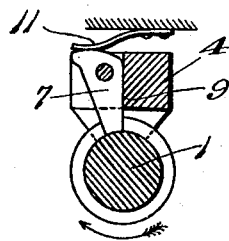
Inventor:
J. A. Nordin Patented Jan. 13, 1925.

1,523,276

UNITED STATES PATENT OFFICE.

JOSEF AUGUST NORDIN, OF STOCKHOLM, SWEDEN, ASSIGNOR TO AKTIEBOLAGET STILLE-WERNER, OF STOCKHOLM, SWEDEN, A CORPORATION OF SWEDEN.

CATCHING MEMBER FOR THE MOVEMENT OF MEAT-SLICING MACHINES.

Application filed May 5, 1923. Serial No. 636,908.

*To all whom it may concern:*

Be it known that I, JOSEF AUGUST NORDIN, a subject of the King of Sweden, residing at Gotgatan 14, Stockholm, in the Kingdom of Sweden, have invented certain new and useful Improvements in Catching Members for the Movement of Meat-Slicing Machines, of which the following is a specification.

In meat-slicing machines the movement of the table, carrying the meat, towards the plane of the disk knife generally is effected by means of a nut segment or the like being in engagement with a screw-threaded spindle. The movement will cease when the nut segment leaves the screw-thread. For returning the nut segment into engagement with the screw-thread, when the rotary direction of the spindle is reversed, a catching member in combination with the nut segment has been used.

The present invention relates to a catching member, which compared with arrangements hitherto employed for the same purpose offers the advantage of being of a simpler construction. The catching member in question is not provided with any sensitive parts or parts easily exposed to wear such as springs and slippers and consequently is tenable.

An embodiment of the invention is illustrated in the accompanying drawing, in which Fig. 1 is a side view of one end of the spindle and the nut segment, the latter as well as part of the spindle being shown in section. Figs. 2 and 3 are sections through the line *a—b* the catching member being shown in different positions. Fig. 4 is a sectional view of a slightly modified form of the invention.

The threads 2 of the spindle 1 are turned off at 3 and consequently the nut segment 4 owing to the rotary movement of the spindle in one direction having been moved to a certain end position will leave the engagement with the threads and slide freely on the spindle whereby the feed of the table (not shown in the drawing) connected to said nut segment will come to a standstill. A stop 5 limits the movement of the nut segment in its direction away from the screw-threads. Provided in the nut segment is a groove or recess 6 for a pawl 7 or the like the latter being pivotally mounted on a screw 8 screwed into the nut segment.

The pawl 7, which is always resting above the screw-threaded part of the spindle and rotatable in a plane at right or nearly right angles to said spindle, on account of its own weight tends to adjust itself with its free end in engagement with a thread.

On the rotating of the spindle in one direction (see Fig. 2) the pawl owing to its own weight and the friction resistance of the screw-threads of the spindle will bear against a shoulder 9 on the nut segment and thus be still in engagement with the screw-threads and, consequently, the nut segment will be returned to engagement with the threads. When the rotary movement of the spindle is reversed and the nut segment has reached the end of the screw-thread the pawl will be moved outwardly from the screw-thread (see Fig. 3) so that the nut segment is automatically released. The pawl will normally be turned out of and fall down in the threads, if the rotary movement of the spindle is continued in the direction last named. In order to facilitate the sliding up of the pawl its free end is bevelled as shown at 10 in Fig. 1.

The lifting up out of and turning down of the pawl into the screw-threads is effected without those disturbing clicks, which generally take place by using spring actuated pawls of the type hitherto known.

The embodiment shown in the drawing presupposes that the nut segment and pawl are mounted vertically above the spindle so that the pawl may turn down of its own weight towards the screw-threads. The pawl may, however, if preferred, also be actuated by a spring 11 tending to turn the same towards the threads as shown in Fig. 4. In this case the nut segment will not of course be mounted vertically above the spindle but may be placed in any position desired.

I claim:

1. A catching member for the movement of meat slicing machines comprising in combination with a rotating screw spindle and a nut segment engaging the spindle, a pawl pivotally mounted on the nut segment in such a way that its axis of rotation is parallel with the axis of the spindle so that when the spindle is rotated in one direction the pawl is by friction action from the spindle caused to move in a plane at substantially right angles to the axis of the screw spindle and thus be disengaged from the screw thread thereof, and a shoulder on the segment for preventing said pawl from being turned out of engagement with the screw thread when the spindle is rotated in the opposite direction.

2. A catching member as claimed in claim 1, wherein a spring is terminated on the pawl and tends to move the pawl into engagement with the screw thread and forces the same into the shoulder, substantially as and for the purposes set forth.

In testimony whereof I have affixed my signature in presence of two witnesses.

JOSEF AUGUST NORDIN.

Witnesses:
STURE OFVIDINGER,
EDWARD LARSON.